Jan. 6, 1970     L. P. HOCKING     3,488,464

AIR PRESSURE OPERATED PILOT LIGHT WITH TESTING PUSHBUTTON

Filed April 12, 1968     2 Sheets-Sheet 1

INVENTOR
LOREN P. HOCKING

ATTORNEYS

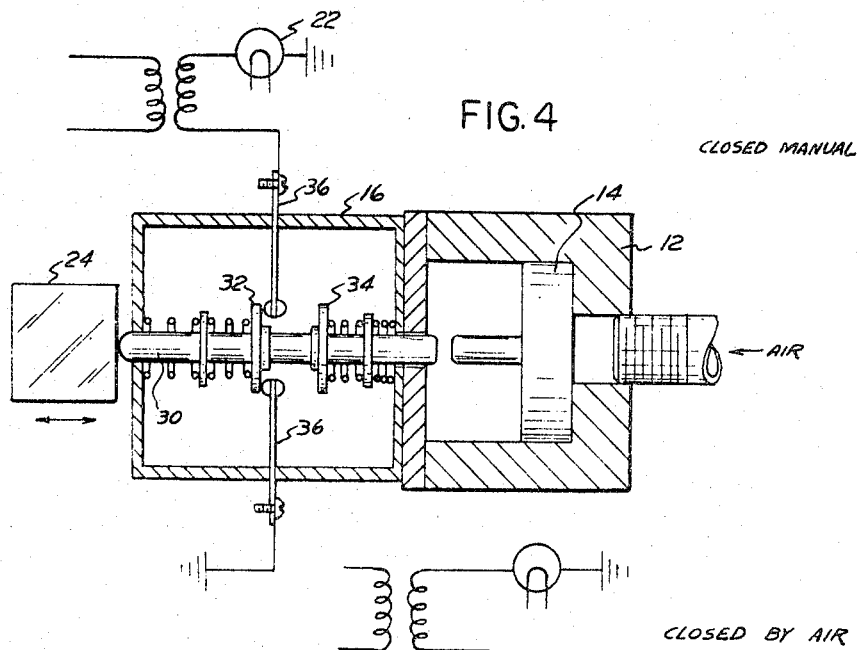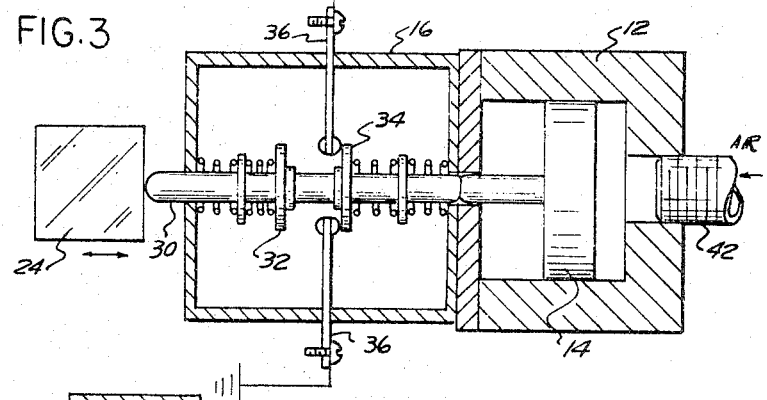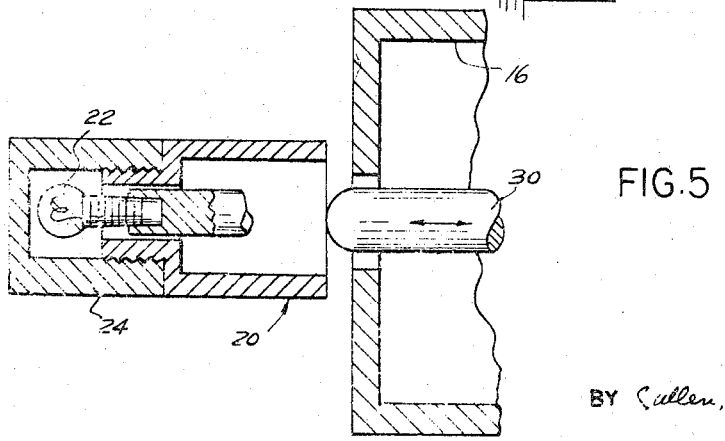

United States Patent Office 3,488,464
Patented Jan. 6, 1970

3,488,464
AIR PRESSURE OPERATED PILOT LIGHT WITH TESTING PUSHBUTTON
Loren P. Hocking, East Detroit, Mich., assignor to Stegner Electric Controls, Inc., Detroit, Mich.
Filed Apr. 12, 1968, Ser. No. 721,021
Int. Cl. H01h 35/38
U.S. Cl. 200—82
4 Claims

ABSTRACT OF THE DISCLOSURE

An air pressure operated electrically energized pilot light device provided with a testing pushbutton and comprising the combination of an air cylinder, a switch casing, a transformer, and a pilot light and pushbutton mounting.

---

This application discloses a novel pilot light device characterized by its being a compact and unitary assembly of individual components which when properly mounted and connected enable a pilot light to respond to a predetermined level of air pressure supply connected to said device and likewise to respond to a pushbutton operation for testing the functioning of the device itself, with the pilot light normally being de-energized, and energized only when the predetermined air pressure level has been reached or the pushbutton operated.

It will be understood that in the main the device is made up of standard components electrically and mechanically interconnected to form a novel device of compact and unitary assembled form and functioning for the purposes described in a novel manner.

For an understanding of this device, reference should be had to the appended drawings.

Figure 1:
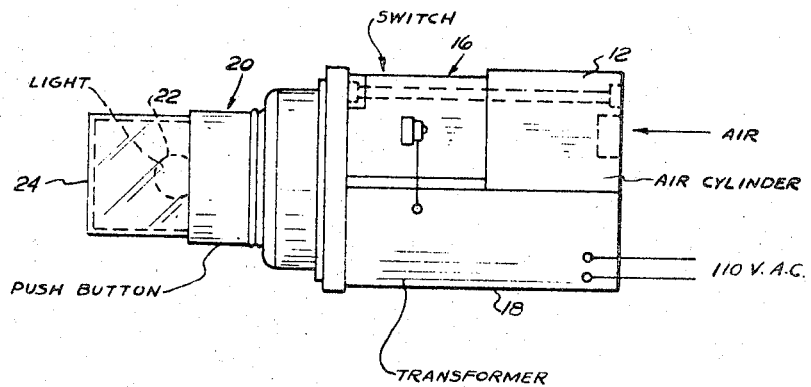
Figure 2:
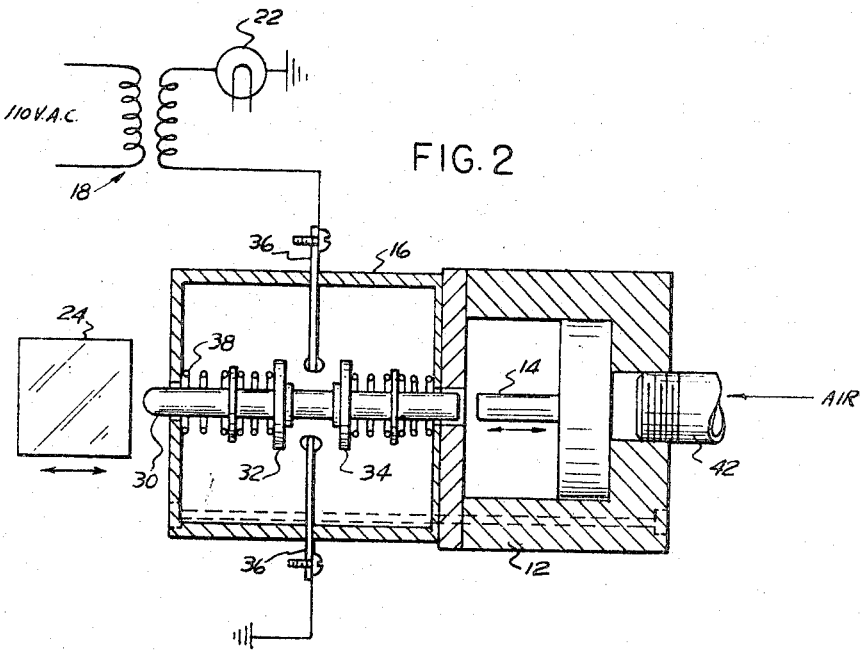

In these drawings:
FIG. 1 is an elevation view of the device.
FIG. 2 is a diagrammatic view of the device with the parts shown in neutral position, that is to say, with the pilot light de-energized.
FIG. 3 is a view like FIG. 2, but showing the parts with the pilot light energized in response to a predetermined level of air pressure.
FIG. 4 is a view like FIG. 2 but showing the pilot light energized in response to pushbutton operation.
FIG. 5 is a fragmentary view diagrammatically illustrating the structural relationship between the pilot light and the pushbutton of the device.

Referring to these drawings, it will be observed that they show a device comprising in combination an air cylinder 12 having a piston 14 therein. Secured to said cylinder 12 is a switch casing 16. Also secured to the cylinder is a transformer 18. Secured to the switch casing 16 is a sub-assembly comprising a pilot light and mounting therefor indicated at 20 and containing a pilot light 22 and also containing an exposed and manually accessible pushbutton 24.

In the main the foregoing components are standard conventional components and in the novel arrangement the transformer 18 provides a base on which the air cylinder 12 and the switch casing 16 are mounted in end to end relation. The pilot light and pushbutton assembly 20 is also secured to the transformer and the switch casing to form a compact and unitary assembly.

Also as is conventional, the pushbutton 24 is made translucent and is mounted in a manner to surround and thus shield the pilot light 22 and be illuminated by it.

The switch casing 16 contains a reciprocating switching rod 30 having two separated contactors 32–34 thereon. The switch casing also has separated stationary contacts 36–36 and these are adapted to be bridged and connected alternately by either of the contactors 32 or 34 as the rod 30 reciprocates. Springs 38 on the switching rod normally maintain both of the contactors 32–34 separated from the stationary contacts 36.

The contacts 36, the transformer 18, and the lamp 22 are interconnected as illustrated to form a circuit which is normally open, but is closed when either contactor 32 or 34 engages both contacts 36.

The switching rod 30 projects at its ends through the ends of the switch casing 16. The left end illustrated is connected to the pushbutton 24 whereby the latter may be moved manually to move the switching rod 30 and engage contactor 32 with contacts 36 and complete the circuit to energize the pilot lamp 22.

The other end or right end as illustrated of the switching rod 30 is exposed to piston rod 14 to be engaged by it and be moved by the piston rod so as to engage the other contactor 34 with contacts 36 and bridge them and close the circuit to the pilot light 22. The connection between the switching rod 30 and the piston rod 14 is of a form whereby the piston rod 14 can and will move the switching rod 30 to the left as illustrated.

The device also includes an air supply 42 for the air cylinder 12 for moving the piston rod 14 and thus the switching rod 30 to energize the lamp circuit in response to a predetermined level of air pressure in the cylinder 12.

OPERATION

Normally, with air supply 42 connected to cylinder 12 but with air pressure level being below a predetermined level, the parts are in the position shown in FIG. 2, that is neutral position and pilot lamp 22 is dark.

In the event, however, the air pressure at 42 reaches or exceeds the predetermined level, piston rod 14 is moved to the left and this causes the pilot lamp circuit to be closed through contacts 36, contactor 34 and transformer 18 and the lamp 22 glows indicating that the predetermined air pressure level has been reached.

In the event it is desired to test out the operation of the device itself and to make certain that the device is operating satisfactorily, the pushbutton 24 may be pushed in to the right to close the lamp circuit through contacts 36 and contactor 32 and the lamp will glow showing that the device itself is functioning properly and ready to reveal by glowing under proper circumstances that the predetermined air pressure level has been reached.

Now having described the device herein disclosed, reference should be had to the claims which follow.

I claim:
1. In an air pressure operated electrically energized pilot light device provided with a testing pushbutton; the combination of an air cylinder having a piston and piston rod therein;
a switch casing secured to said cylinder;
a transformer also secured to said cylinder;
a pilot light and mounting therefor secured to said switch casing and containing an exposed and manually accessible pushbutton; with said switch casing containing a reciprocating switching rod having two separated contactors thereon;
and said switch casing also having separated stationary contacts adapted to be bridged and connected alternately by either of said contactors as the switching rod reciprocates;
with said contacts, said transformer, and said lamp being interconnected to form a circuit, normally open but closed when either contactor engages both contacts;
springs on said switching rod normally maintaining both of its contactors separated from the stationary contacts;
with said switching rod projecting at its ends through the switch casing, with one end of said switching rod connected to the pushbutton whereby the latter may be moved manually to move the switching rod and engage one of said contactors with said contacts; and the other end of said switching rod being exposed to said piston rod to be engaged thereby and be moved by said piston rod so as to engage the other of said contactors with said contacts; the connection between the two rods being of a form whereby the piston rod can and will move the switching rod; and an air supply for said air cylinder for moving the piston rod and thus the switching rod to energize the lamp circuit in response to a predetermined level of air pressure in said cylinder.

2. The device of claim 1, with the transformer providing a base on which the air cylinder and switch casing are mounted, with these being in end to end relation; and the pilot light and pushbutton mounting being secured to an end of the transformer and of the switch casing, to form a compact and unitary assembly.

3. The device of claim 1, with the pushbutton being translucent and surrounding the pilot light.

4. The device of claim 2, with the pushbutton being translucent and surrounding the pilot light.

References Cited

UNITED STATES PATENTS 2,591,336   4/1952   Bordelon.
3,040,142   6/1962   Dietrich et al. ____ 200—159 XR
3,060,290   10/1962  Gagan.

ROBERT K. SCHAEFER, Primary Examiner

J. R. SCOTT, Assistant Examiner

U.S. Cl. X.R.

200—16, 159, 167, 169